(12) United States Patent
Guo et al.

(10) Patent No.: US 11,864,157 B2
(45) Date of Patent: Jan. 2, 2024

(54) METHOD AND APPARATUS FOR AVOIDING PAGING COLLISION IN A WIRELESS COMMUNICATION SYSTEM

(71) Applicant: ASUSTek Computer Inc., Taipei (TW)

(72) Inventors: Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/853,116

(22) Filed: Apr. 20, 2020

(65) Prior Publication Data

US 2020/0374833 A1 Nov. 26, 2020

Related U.S. Application Data

(60) Provisional application No. 62/850,749, filed on May 21, 2019.

(51) Int. Cl.
*H04W 68/02* (2009.01)
*H04W 88/06* (2009.01)
*H04W 48/18* (2009.01)
*H04W 76/27* (2018.01)
*H04W 8/18* (2009.01)

(52) U.S. Cl.
CPC .......... *H04W 68/02* (2013.01); *H04W 8/183* (2013.01); *H04W 48/18* (2013.01); *H04W 76/27* (2018.02); *H04W 88/06* (2013.01)

(58) Field of Classification Search
CPC ..... H04W 38/02; H04W 88/06; H04W 76/27; H04W 48/18; H04W 8/183
See application file for complete search history.

(56) References Cited

U.S. PATENT DOCUMENTS

| 8,862,145 B2 | 10/2014 | Chin et al. |
| 8,977,261 B2 | 3/2015 | Chin et al. |
| 10,492,169 B2 | 11/2019 | Chen |

(Continued)

FOREIGN PATENT DOCUMENTS

| WO | WO-2013124046 A1 * | 8/2013 | ........ H04W 36/0072 |
| WO | 2020/124057 | 6/2020 | |

OTHER PUBLICATIONS

Notice of Submission of Opinion from Korean Intellectual Property Office in corresponding KR Application No. 10-2020-0047667, dated Mar. 30, 2021.

(Continued)

*Primary Examiner* — Muthuswamy G Manoharan
(74) *Attorney, Agent, or Firm* — Skaar Ulbrich Macari, P.A.

(57) ABSTRACT

A method and device are disclosed from the perspective of a User Equipment (UE) with a first USIM (Universal Subscriber Identity Module) and a second USIM. In one method, the method includes the UE performing paging monitoring in a first serving cell associated with the first USIM. The method also includes the UE performing paging monitoring in a second serving cell associated with the second USIM. The method further includes the UE transmitting, to a network node associated with the second USIM, information related to at least one of the paging monitoring performed in the first serving cell or the paging monitoring performed in the second serving cell.

20 Claims, 11 Drawing Sheets

(56) References Cited

U.S. PATENT DOCUMENTS

| | | | | |
|---|---|---|---|---|
| 2013/0010707 A1* | 1/2013 | Gaal | ................... | H04W 68/00 |
| | | | | 370/329 |
| 2015/0017982 A1 | 1/2015 | Klatt | | |
| 2018/0368099 A1* | 12/2018 | Chen | ................... | H04W 48/18 |
| 2019/0124636 A1 | 4/2019 | Jiang et al. | | |
| 2020/0396714 A1* | 12/2020 | Lee | ..................... | H04W 36/30 |
| 2022/0030548 A1* | 1/2022 | Chun | ................... | H04W 68/02 |
| 2022/0061023 A1* | 2/2022 | Xu | ....................... | H04W 8/245 |

OTHER PUBLICATIONS

Qualcomm Incorporated, Oppo, China Unicom, Vivo, "Avoidance of Paging Collisions to Minimize Outage of Services," S2-174243, SA WG2 Meeting #122, Jun. 26-30, 2017, San Jose Del Cabo, Mexico.

European Search Report from corresponding EP Application No. 20170292.5, dated Oct. 5, 2020.

Qualcomm Incorporated et al.: "Avoidance of Paging Collisions to minimize outage of services", 3GPP Draft; S2-174243-PagingCollision V8, 3rd Generation Partnership Project (3GPP), Mobile Competence Centre; 650, Route Des Lucioles; F-06921 Sophia-Antipolis Cedex; France, Jun. 25, 2017, XP051303098.

Office Action for the corresponding European Patent Application rendered by the European Patent Office (EPO) dated Mar. 30, 2023, 6 pages.

* cited by examiner

US 11,864,157 B2

METHOD AND APPARATUS FOR AVOIDING PAGING COLLISION IN A WIRELESS COMMUNICATION SYSTEM

CROSS-REFERENCE TO RELATED APPLICATIONS

The present Application claims the benefit of U.S. Provisional Patent Application Ser. No. 62/850,749 filed on May 21, 2019, the entire disclosure of which is incorporated herein in their entirety by reference.

FIELD

This disclosure generally relates to wireless communication networks, and more particularly, to a method and apparatus for avoiding paging collision in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a User Equipment (UE) with a first USIM (Universal Subscriber Identity Module) and a second USIM. In one method, the method includes the UE performing paging monitoring in a first serving cell associated with the first USIM. The method also includes the UE performing paging monitoring in a second serving cell associated with the second USIM. The method further includes the UE transmitting, to a network node associated with the second US IM, information related to at least one of the paging monitoring performed in the first serving cell or the paging monitoring performed in the second serving cell.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: SP-190248, "Revised SID: Study on system enablers for multi-SIM devices"; TS 38.304 V15.3.0, "User Equipment (UE) procedures in Idle mode and RRC Inactive state"; TS 38.300 V15.5.0, "NR and NG-RAN Overall Description"; TS 38.331 V15.5.1, "NR Radio Resource Control (RRC) protocol specification"; and TS 24.501 V16.0.2, "Non-Access-Stratum (NAS) protocol for 5G System (5GS)". The standards and documents listed above are hereby expressly incorporated by reference in their entirety.

Figure 1:
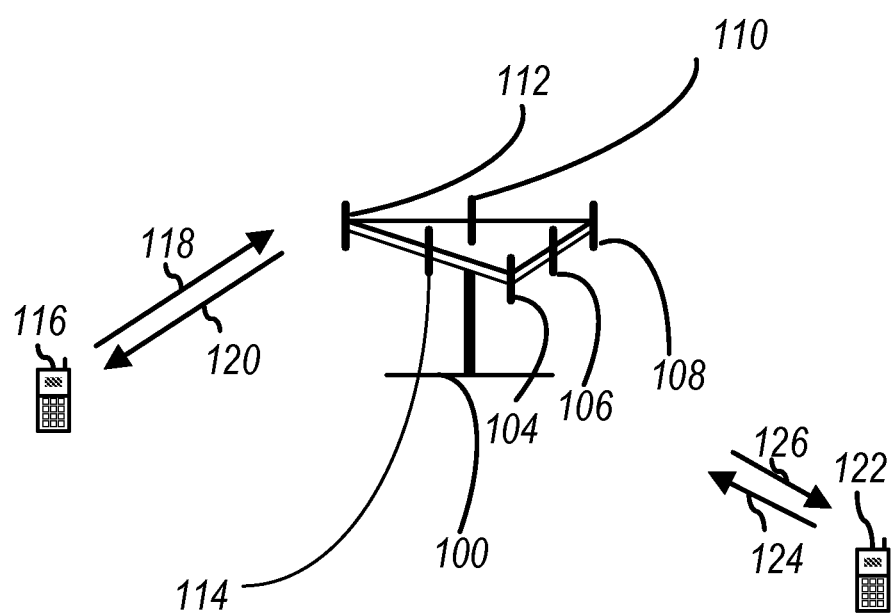
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
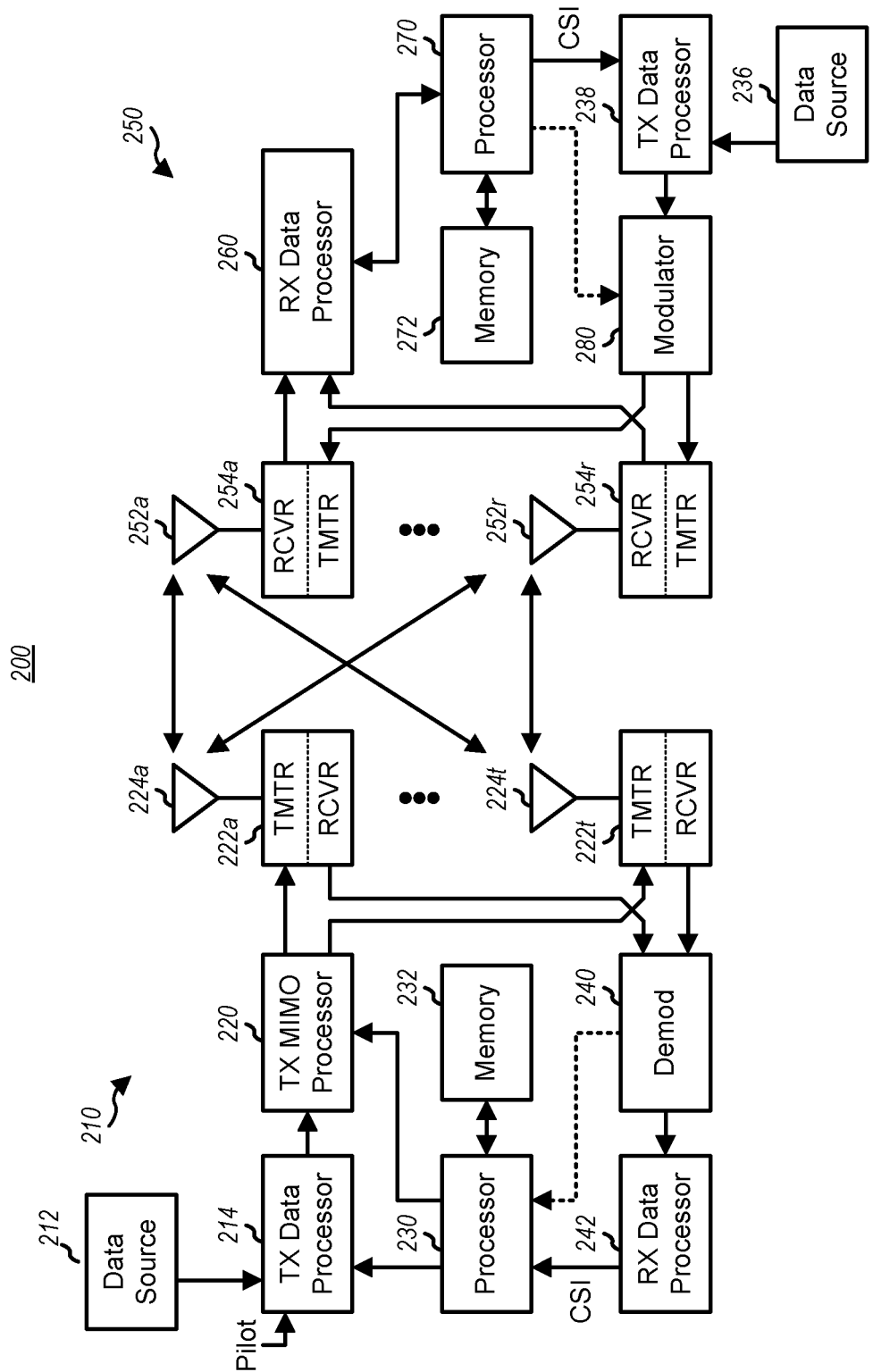
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
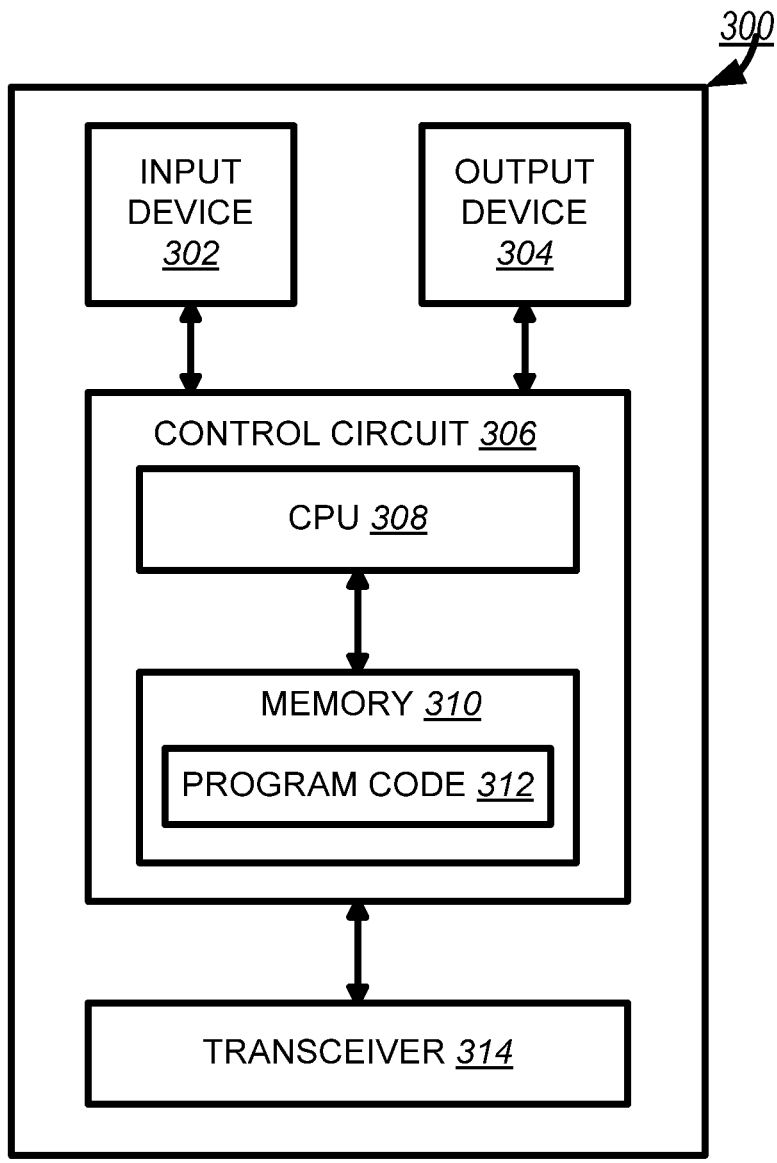
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
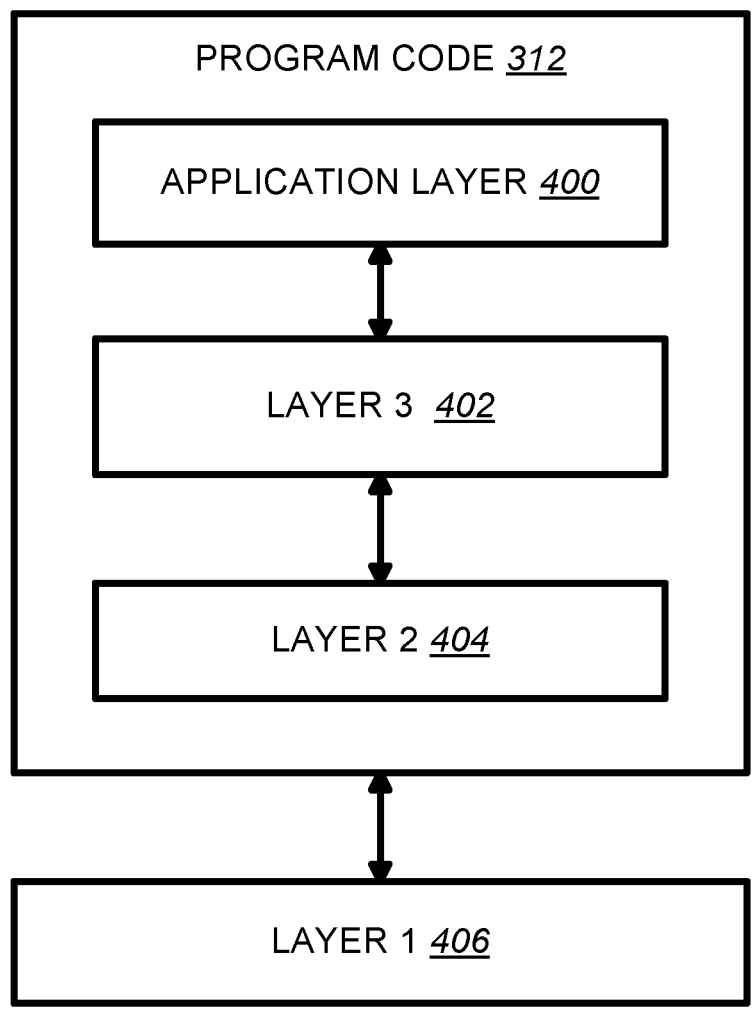
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

A study item for improvement on multi-USIM devices has been approved (as discussed in 3GPP SP-190248). Justification of this study item is discussed in 3GPP SP-19-248 as follows:

Many commercially deployed devices support more than one USIM card (typically two). Multi-USIM devices typically address the following two use cases:
1) The user has both a personal and a business subscription and wishes to use them both from the same device. This use case has become popular with the BYOD initiatives in the enterprise world.
2) The user has multiple personal subscriptions and chooses which one to use based on the selected service (e.g. use one individual subscription and one "family circle" plan).

In either of the two use cases the USIMs may be from the same or from different MNOs.

In the past these kind of multi-USIM devices have been particularly popular in emerging economies, but are nowadays spreading even in regions that so far have not witnessed massive demand for multi-USIM devices.

Support for multi-USIM is currently handled in an implementation-specific manner without any support from 3GPP specifications, resulting in a variety of implementations and UE behaviours (e.g. Dual SIM Single Standby, Dual SIM Dual Standby, Dual SIM Dual Active, etc.).

For cost efficiency reasons, a multi-USIM device implementation typically uses common radio and baseband components that are shared among the multiple USIMs, which can lead to several issues that impact the 3GPP system performance. Consider a multi-USIM device that is actively engaged in communication with a 3GPP system:

While actively communicating with the first system, the UE needs to occasionally check the other system (e.g. to read the paging channel, perform measurements, or read the system information). This occasional activity on the second system may or may not have any performance impact, depending on the UE implementation.

NOTE 1: The specific aspects of how the UE manages to read information in the second system while actively communicating with the first system are not to be considered in SA2, but could be considered in RAN working groups.

Paging Occasions (POs) are calculated based on the UE identifier (IMSI and 5G-S-TMSI for EPS and 5GS, respectively). In some cases the UE identifier values associated with the different USIMs can lead to systematic collisions which may result in missed pages.

When the UE receives a page on the second system, the UE needs to be able to decide whether it should respond to the page (e.g. by following user-configured rules). In the absence of information indicating the service type that triggered the paging, the UE would have to blindly decide whether to ignore the page or respond to it.

NOTE 2: It is noted that UTRA-Uu supports a Paging Cause which indicates the traffic type that triggered the page.

When the UE decides to respond to the page in the second system, or when the UE needs to perform some signalling activity in the second system (e.g. Periodic Mobility Registration Update), the UE may need to stop the current activity in the first system. In the absence of any procedure for suspension of the ongoing activity, the UE has to autonomously release the RRC connection with the first system and abruptly leave. This is likely to be interpreted as an error case by the first system and has the potential to distort the statistics in the first system, and misguide the algorithms that rely on them. Moreover, during the UE's absence, the first system will keep paging the UE which will result in waste of paging resources.

The objective of the study item for multi-USIM devices is discussed in 3GPP SP-190248 as follows:

This study item shall address the following system enablers for multi-USIM devices:

A mechanism for delivering paging destined to USIM A while the UE is actively communicating with USIM B.

A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner. The study shall determine how the network handles MT data or MT control-plane activity occurrence on a suspended connection.

A mechanism for avoidance of paging collisions occurring in the UE between USIM A and USIM B.

Handling of emergency calls and sessions.

Handling of service prioritization i.e. the study shall determine whether the UE behaviour upon reception of paging information is driven by USIM configuration or user preferences or both.

NOTE 1: This objective is expected to be further aligned through Stage 1 requirements. Additional objectives may be added if there are further Stage 1 requirements.

NOTE 2: The enablers for Dual-USIM are expected to also apply to multi-USIM scenarios. The study shall be restricted to single Rx/single Tx and dual Rx/single Tx UE implementations.

NOTE 3: The focus of the study is on enablers for multi-USIM implementations relying on common radio and baseband components that are shared among the multiple USIMs.

The problem statement being common to 5GS and EPS, it is expected that the study conclusions will apply to both 5GS and EPS, but the solutions for 5GS and EPS need not be the same.

The system enablers for multi-USIM devices are expected to apply for the cases where the multiple USIMs are owned by the same or by different MNOs.

Paging monitoring in NR is discussed in 3GPP TS 38.304 as follows:

7.1 Discontinuous Reception for Paging

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.

In multi-beam operations, the UE assumes that the same paging message is repeated in all transmitted beams and thus the selection of the beam(s) for the reception of the paging message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

(SFN+PF_offset)mod T=(T div N)*(UE_ID mod N)

Index (i_s), indicating the index of the PO is determined by:

i_s=floor(UE_ID/N)mod Ns

The PDCCH monitoring occasions for paging are determined according to pagingSearchSpace as specified in TS 38.213 [4] and firstPDCCH-MonitoringOccasionOfPO if configured as specified in TS 38.331 [3]. When SearchSpaceId=0 is configured for pagingSearchSpace, the PDCCH monitoring occasions for paging are same as for RMSI as defined in clause 13 in TS 38.213 [4]. When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. A PO is a set of 'S' consecutive PDCCH monitoring occasions where 'S' is the number of actual transmitted SSBs determined according to ssb-PositionsInBurst in SIB1. The $K^{th}$ PDCCH monitoring occasion for paging in the PO corresponds to the $K^{th}$ transmitted SSB. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of $(i\_s+1)^{th}$ PO is the $(i\_s+1)^{th}$ value of the firstPDCCH-MonitoringOccasionOfPO parameter; otherwise, it is equal to i_s*S.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value, if configured by RRC or upper layers, and a default DRX value broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset as defined in TS 38.331 [3]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in TS 23.501 [10]. 5G-S-TMSI shall in the formulae above be interpreted as a binary number where the left most bit represents the most significant bit.

Beam operation is an important characteristic in NR. Quality of a beam could be derived by the UE from the measurement of received SSB (Synchronization Signal (and PBCH) Block) or CSI-RS (Channel State Information Reference Signal) associated with the beam. 3GPP TS 38.300 introduced SSB as shown below, and the structure of SSB is shown in FIG. 5 (which is a reproduction of FIG. 5.2.4-1 of 3GPP TS 38.300 V15.5.0, entitled "Time-frequency structure of SSB"):

5.2.4 Synchronization Signal and PBCH Block

Figure 5:
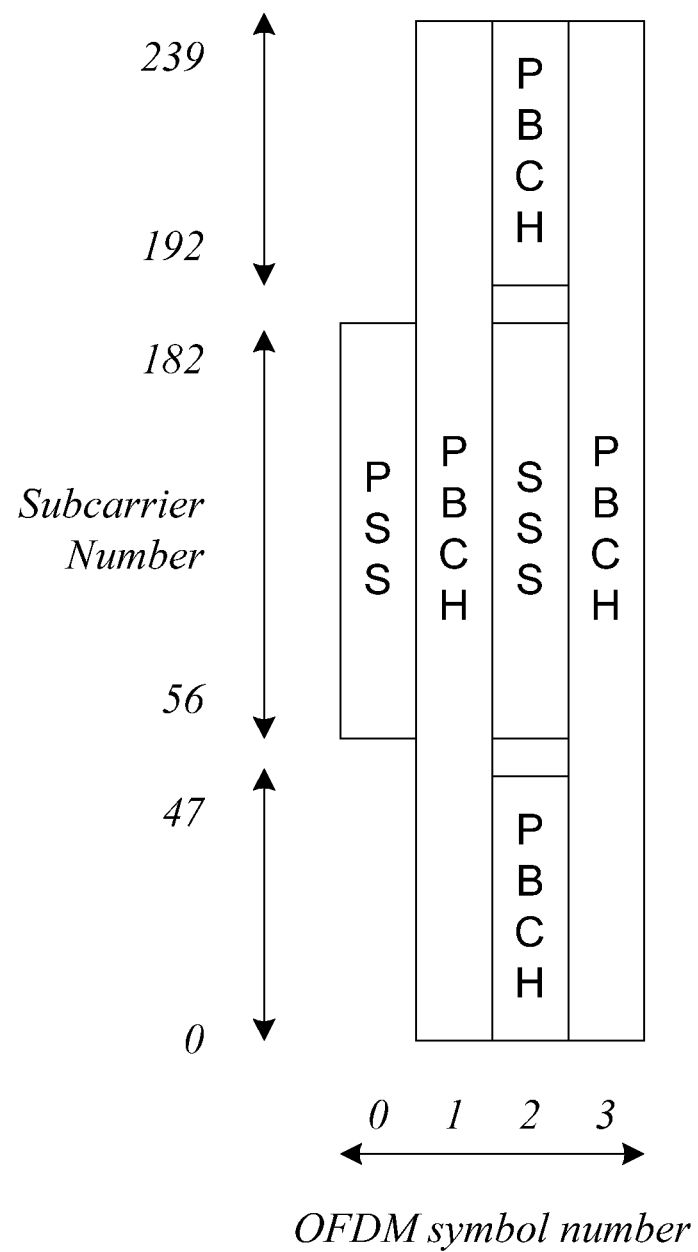
FIG. 5 is a reproduction of FIG. 5.2.4-1 of 3GPP TS 38.300 V15.5.0.

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS as show in FIG. 5.2.4-1. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The PCIS of SSBs transmitted in different frequency locations do not have to be unique, i.e. different SSBs in the frequency domain can have different PCIS. However, when an SSB is associated with an RMSI, the SSB corresponds to an individual cell, which has a unique NCGI (see subclause 8.2). Such an SSB is referred to as a Cell-Defining SSB (CD-SSB). A PCell is always associated to a CD-SSB located on the synchronization raster.

If beam failure is detected, the UE would perform a beam failure recovery procedure to find a qualified beam as discussed in 3GPP TS 38.300 as follows:

9.2.8 Beam Failure Detection and Recovery

For beam failure detection, the gNB configures the UE with beam failure detection reference signals (SSB or CSI-RS) and the UE declares beam failure when the number of beam failure instance indications from the physical layer reaches a configured threshold before a configured timer expires.

SSB-based Beam Failure Detection is based on the SSB associated to the initial DL BWP and can only be configured for the initial DL BWPs and for DL BWPs containing the SSB associated to the initial DL BWP. For other DL BWPs, Beam Failure Detection can only be performed based on CSI-RS.

After beam failure is detected, the UE:

triggers beam failure recovery by initiating a Random Access procedure on the PCell;

selects a suitable beam to perform beam failure recovery (if the gNB has provided dedicated Random Access resources for certain beams, those will be prioritized by the UE).

Upon completion of the Random Access procedure, beam failure recovery is considered complete.

Additionally, quality of a cell is also determined based on quality of beam(s) of the cell. If a serving cell of the UE (e.g. PCell) is considered as radio link failure, the UE would perform a RRC re-establishment procedure to find a suitable cell to re-establish RRC connection as discussed in 3GPP TS 38.300 as follows:

9.2.7 Radio Link Failure

In RRC_CONNECTED, the UE performs Radio Link Monitoring (RLM) in the active BWP based on reference signals (SSB/CSI-RS) and signal quality thresholds configured by the network. SSB-based RLM is based on the SSB associated to the initial DL BWP and can only be configured for the initial DL BWP and for DL BWPs containing the SSB associated to the initial DL BWP. For other DL BWPs, RLM can only be performed based on CSI-RS.

The UE declares Radio Link Failure (RLF) when one of the following criteria are met:

Expiry of a timer started after indication of radio problems from the physical layer (if radio problems are recovered before the timer is expired, the UE stops the timer); or Random access procedure failure; or RLC failure.

After RLF is declared, the UE:

stays in RRC_CONNECTED;

selects a suitable cell and then initiates RRC re-establishment;

enters RRC_IDLE if a suitable cell was not found within a certain time after RLF was declared.

One of the objectives in the study item for multi-USIM devices (as discussed in 3GPP SP-190248) is to avoid paging collisions occurring in the UE between different USIMs. Since a PO (Paging Occasion) includes a set of PDCCH (Physical Downlink Control Channel) monitoring occasions, e.g. due to multi-beam operation, overlap (in time domain) of POs and/or PDCCH monitoring occasions for paging associated with different USIMs could be more likely to occur in NR. If the UE has single Rx and the UE needs to monitor paging for these USIMs (e.g. due to user preference, to detect potential mobile terminating traffic, to detect potential system information change, to detect potential public warning message), the paging associated with one USIM (e.g. USIM A) may be delivered to the UE while the UE is communicating with the system associated with another USIM (e.g. USIM B), and the UE may miss a paging due to the collision or overlap.

Additionally, POs and/or PDCCH monitoring occasions for paging associated with USIM A may overlap with transmission timing of other signaling, e.g. SSB and/or CSI-RS, associated with USIM B. If the UE has single Rx, the UE may not be able to monitor paging with USIM A and other signaling (e.g. SSB, CSI-RS) with USIM B simultaneously, and the UE may either miss a paging associated with USIM A or SSB/CSI-RS associated with USIM B. Missing of SSB/CSI-RS may result in beam failure and/or radio link failure. Then, connectivity in 3GPP system associated with USIM B is interrupted.

Hence, a mechanism to avoid collision or overlap discussed above should be considered.

Figure 6:
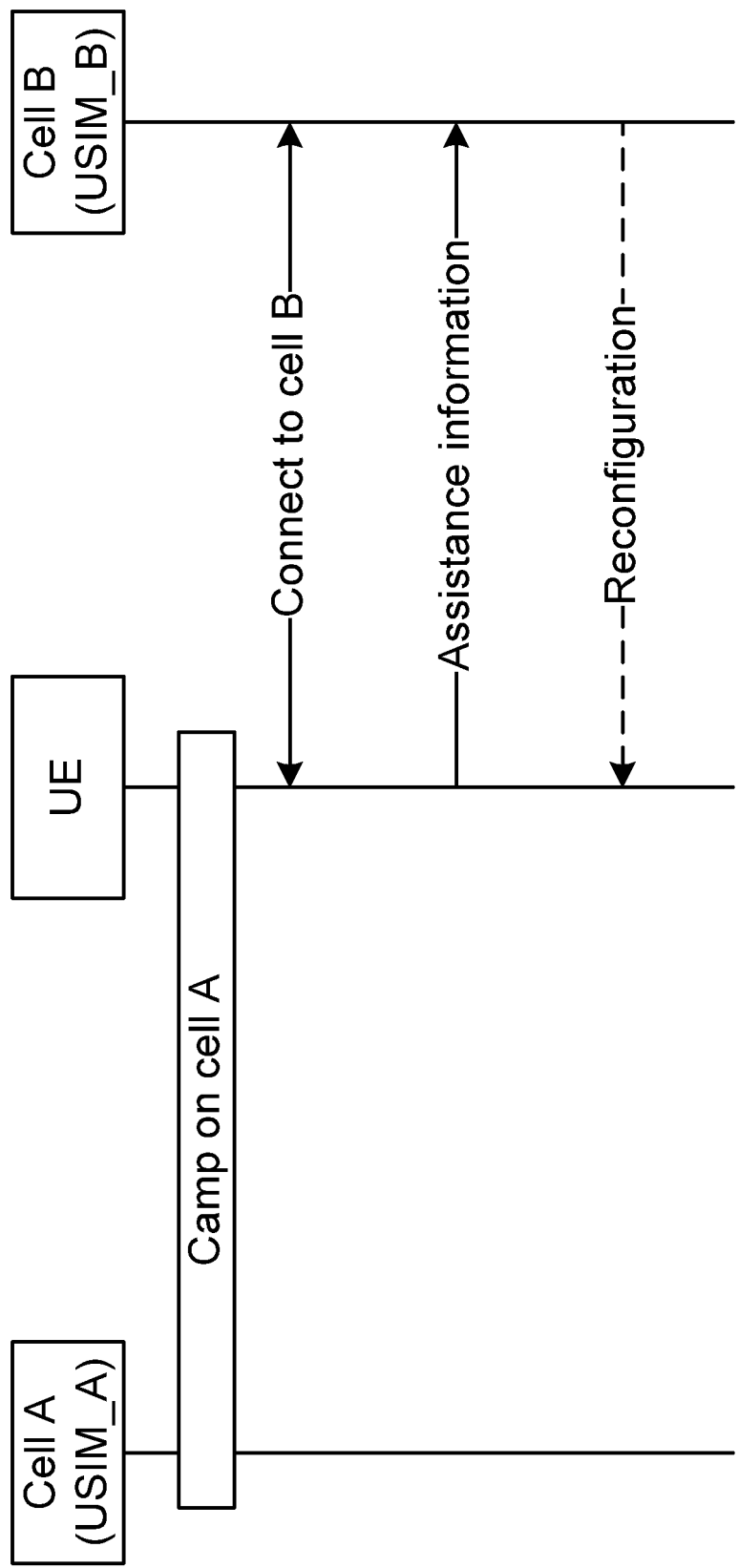
FIG. 6 is a diagram according to one exemplary embodiment.
Figure 7:
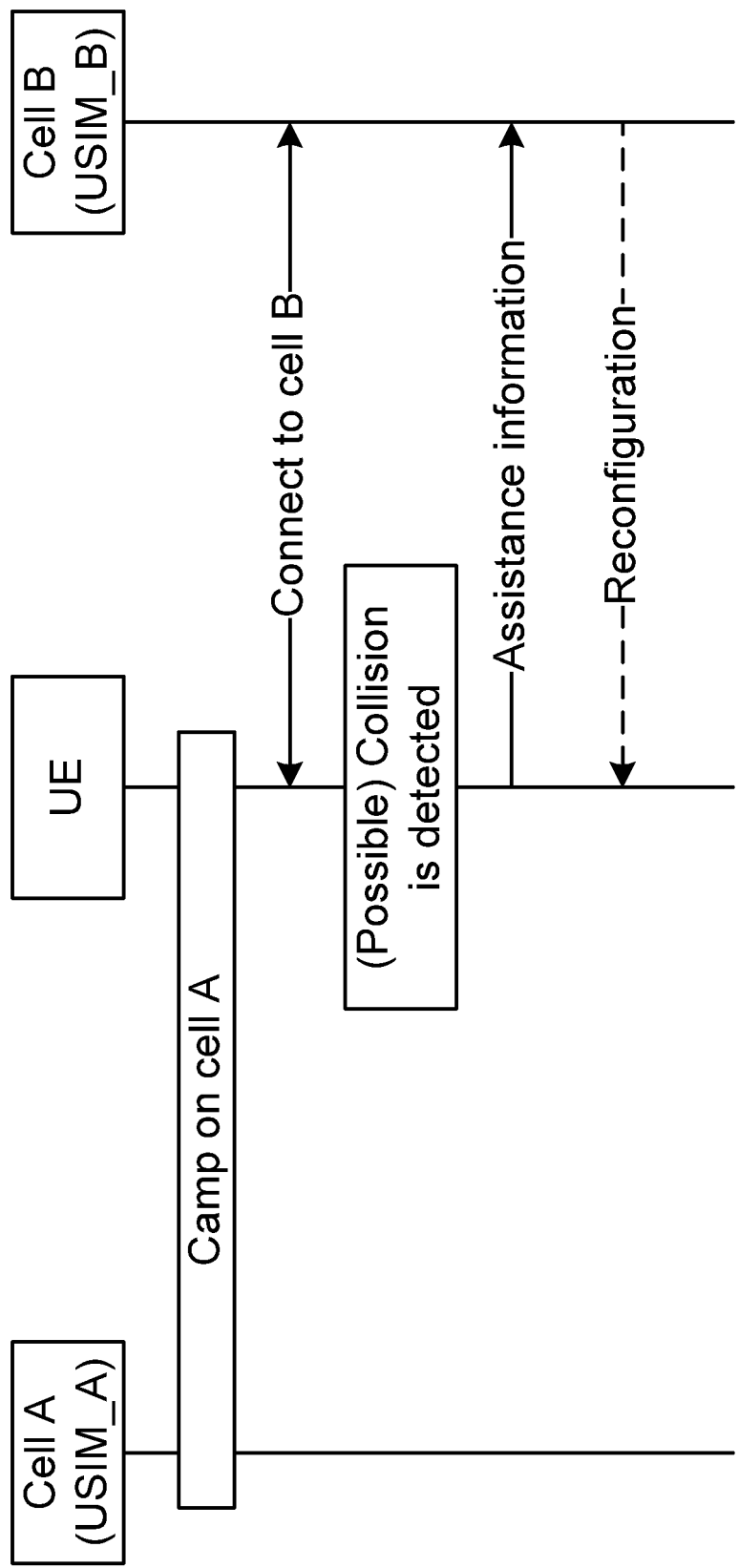
FIG. 7 is a diagram according to one exemplary embodiment.

The concept of the invention is that for a UE with multiple USIMs, including a first USIM and a second USIM, the UE could provide information, related to paging monitoring (associated with the first USIM), to a network node associated with the second USIM. An example is shown in FIG. 6. Alternatively, the UE could provide information, related to collision of paging monitoring (associated with the first USIM), to a network node associated with the first USIM. Alternatively or additionally, the UE could provide information, related to collision of paging monitoring (associated with the first USIM), to a network node associated with the second USIM. An example is shown in FIG. 7. The information could assist the network associated with one USIM to schedule the timing of transmitting paging and/or other signaling (such as SSB or CSI-RS) such that the transmission will not be collided with some communication (e.g. paging, SSB transmission, CSI-RS transmission) associated with other USIM.

The information could indicate one or multiple of following:

Timing of the paging monitoring associated with the first USIM

The timing could include the time that the UE should monitor paging associated with the first USIM, e.g. a time pattern derived based on the UE_ID associated with the first USIM (specified in 3GPP TS 38.304). The timing could include paging frame(s) for the first USIM. The timing could include paging occasion(s) for the first USIM. The timing could include PDCCH monitoring occasion(s) for paging for the first USIM.

Value(s) of parameter(s) used to calculate timing of the paging monitoring associated with the first USIM The parameter(s) could be used to calculate the timing that the UE should monitor paging associated with the first USIM, e.g. a time pattern derived based on the UE_ID associated with the first USIM (specified in 3GPP TS 38.304). The parameter(s) could be used to calculate paging frame(s) for the first USIM. The parameter(s) could be used to calculate paging occasion(s) for the first USIM. The parameter(s) could be used to calculate PDCCH monitoring occasion(s) for paging for the first USIM. The parameter(s) could be broadcasted in a serving cell associated with the first USIM. The parameter(s) could be configured by (a dedicated signaling from) a network node associated with the first USIM. The parameter(s) could include PF_offset, T, N, Ns, nAndPagingFrameOffset, and/or UE_ID. The parameter(s) could include pagingSearchSpace, firstPDCCH-MonitoringOccasionOfPO, and/or the number of actual transmitted SSBs in a serving cell associated with the first USIM.

Indication about (possible) occurrence of the collision of the paging monitoring, e.g. associated with the first USIM The indication may indicate there is or there will be collision of the paging monitoring, e.g. associated with the first USIM. The collision could be between paging monitoring associated with the first USIM and paging monitoring associated with the second USIM. Alternatively, the collision could be between paging monitoring associated with the first USIM and reception of signaling associated with the second USIM. The signaling could be SSB. Alternatively or additionally, the signaling could be (periodic) CSI-RS. The UE receives the signaling in a serving cell associated with the second USIM.

The indication could indicate timing when the collision occurs, e.g. in which paging frame(s) and/or paging occasion(s) (associated with the first USIM).

Indication about relief of the collision of the paging monitoring, e.g. associated with the first USIM The indication may indicate the collision of the paging monitoring, e.g. associated with the first USIM, is relieved. The relief of the collision could be from the collision between paging monitoring associated with the first USIM and paging monitoring associated with the second USIM. Alternatively, the relief of the collision could be from the collision between paging monitoring associated with the first USIM and reception of signaling associated with the second USIM. The signaling could be SSB and/or (periodic) CSI-RS. The UE may receive the signaling in a serving cell associated with the second USIM.

Suggested timing of the paging monitoring associated with the first USIM

Due to (possible) collision, the UE could suggest alternative timing of the paging monitoring associated with the first USIM. The suggested timing may indicate timing (e.g. a pattern in time domain) that is not collided with paging monitoring and/or signaling transmission such as SSB or CSI-RS associated with other USIM(s) (e.g. the second USIM).

The timing could include paging frame(s) for the first USIM. The timing could include paging occasion(s) for the first USIM. The timing could include PDCCH monitoring occasion(s) for paging for the first USIM.

Suggested value(s) of parameter(s) used to calculate timing of the paging monitoring associated with the first USIM Due to (possible) collision, the UE could suggest alternative value(s) of parameters used to calculate timing of the paging monitoring associated with the first USIM. For example, the parameter(s) could be used to shift the timing of the paging monitoring. The suggested value(s) of parameter(s) may be used to calculate timing that is not collided with paging monitoring and/or signaling transmission such as SSB or CSI-RS associated with other USIM(s) (e.g. the second USIM).

The parameter(s) could be used to calculate paging frame(s) for the first USIM. The parameter(s) could be used to calculate paging occasion(s) for the first USIM. The parameter(s) could be used to calculate PDCCH monitoring occasion(s) for paging for the first USIM. The parameter(s) could be broadcasted in a serving cell associated with the first USIM. The parameter(s) could be configured by (a dedicated signaling from) a network node associated with the first USIM. The parameter(s) could include PF_offset, T, N, Ns, nAndPagingFrameOffset, and/or UE_ID. The parameter(s) could include pagingSearchSpace, firstPDCCH-MonitoringOccasionOfPO, and/or the number of actual transmitted SSBs in a serving cell associated with the first USIM.

Suggested timing of the paging monitoring associated with the second USIM

Due to (possible) collision, the UE could suggest alternative timing of the paging monitoring associated with the second USIM. The suggested timing may indicate timing (e.g. a pattern in time domain) that is not collided with paging monitoring and/or signaling transmission such as SSB or CSI-RS associated with other USIM(s) (e.g. the first USIM).

The timing could include paging frame(s) for the second USIM. The timing could include paging occasion(s) for the second USIM. The timing could include PDCCH monitoring occasion(s) for paging for the second USIM.

Suggested value(s) of parameter(s) used to calculate timing of the paging monitoring associated with the second USIM Due to (possible) collision, the UE could suggest alternative value(s) of parameters used to calculate timing of the paging monitoring associated with the second USIM. For example, the parameter(s) could be used to shift the timing of the paging monitoring. The suggested value(s) of parameter(s) may be used to calculate timing that is not collided with paging monitoring and/or signaling transmission such as SSB or CSI-RS associated with other USIM(s) (e.g. the first USIM).

The parameter(s) could be used to calculate paging frame(s) for the second USIM. The parameter(s) could be used to calculate paging occasion(s) for the second USIM. The parameter(s) could be used to calculate PDCCH monitoring occasion(s) for paging for the second USIM. The parameter(s) could be broadcasted in a serving cell associated with the second USIM. The parameter(s) could be configured by (a dedicated signaling from) a network node associated with the second USIM. The parameter(s) could include PF_offset, T, N, Ns, nAndPagingFrameOffset, and/or UE_ID. The parameter(s) could include pagingSearchSpace, firstPDCCH-MonitoringOccasionOfPO, and/or the number of actual transmitted SSBs in a serving cell associated with the second USIM.

Suggested timing of reception of signaling associated with the second USIM

Due to (possible) collision between paging monitoring associated with the first USIM and reception of signaling associated with the second USIM, the UE could suggest alternative timing of reception of signaling associated with the second USIM. The suggested timing may indicate timing (e.g. a pattern in time domain) that is not collided with paging monitoring and/or signaling transmission such as SSB or CSI-RS associated with other USIM(s) (e.g. the first USIM).

The signaling could be SSB. Alternatively, the signaling could be (periodic) CSI-RS. The UE receives the signaling in a serving cell associated with the second USIM.

Indication related to SFN of a serving cell associated with the first USIM and/or the second USIM To let a network node associated with the second USIM to calculate timing of the paging monitoring associated with the first USIM, SFN of a serving cell associated with the first USIM is necessary information, and vice versa.

The indication could be association between SFN of a serving cell associated with the first USIM and SFN of a serving cell associated with the second USIM. For example, if SFN of a serving cell for the first USIM is 10 when SFN of a serving cell for the second USIM is 30, the UE could indicate (10, 30). The indication could be difference between SFN of a serving cell associated with the first USIM and SFN of a serving cell associated with the second USIM. For example, if SFN of a serving cell for the first USIM is 10 when SFN of a serving cell for the second USIM is 30, the UE could indicate −20 (or +20).

The UE could provide the information in response to one or multiple of following events (e.g. the UE could provide the information upon occurrence of one or multiple of the following events):

(Possible) Occurrence of the collision of paging monitoring associated with the first USIM Relief of the collision of paging monitoring associated with the first USIM Timing of the paging monitoring associated with the first USIM is changed The timing could be changed due to value(s) of parameter(s) used to calculate timing of the paging monitoring associated with the first USIM is changed, e.g. reconfiguration by network or a serving cell associated with the first USIM is changed.

Timing of the paging monitoring associated with the second USIM is changed

The timing could be changed due to value(s) of parameter(s) used to calculate timing of the paging monitoring associated with the second USIM is changed, e.g. reconfiguration by network or a serving cell associated with the second USIM is changed.

The paging monitoring associated with the first USIM is enabled, e.g. due to user preference/configuration The paging monitoring associated with the second USIM is enabled, e.g. due to user preference/configuration The paging monitoring associated with the second USIM is disabled, e.g. due to user preference/configuration Reception of a request from a network node associated with the second USIM Establishment of a RRC connection associated with the second USIM Resume of a RRC connection associated with the second USIM Activation of security for a RRC connection associated with the second USIM Re-establishment of a RRC connection associated with the second USIM Modification of configuration of a RRC connection associated with the second USIM The configuration could be associated with SSB. The configuration could be associated with CSI-RS.

Some of above events could be combined and treated as one event.

The information could be provided in one or multiple of following signaling:

UEAssistanceInformation message (as discussed in 3GPP TS 38.331)

RRCSetupComplete message (as discussed in 3GPP TS 38.331)

RRCResumeComplete message (as discussed in 3GPP TS 38.331)

SecurityModeComplete message (as discussed in 3GPP TS 38.331)

RRCReestablishmentComplete message (as discussed in 3GPP TS 38.331)

RRCReconfigurationComplete message (as discussed in 3GPP TS 38.331)

Registration request message (as discussed in 3GPP TS 24.501)

The UE may provide the information due to the collision of paging monitoring associated with the first USIM. Alternatively, the UE may provide the information regardless of the collision of paging monitoring associated with the first USIM, e.g. the UE provides the information even if there is no collision of paging monitoring associated with the first USIM.

Figure 8:
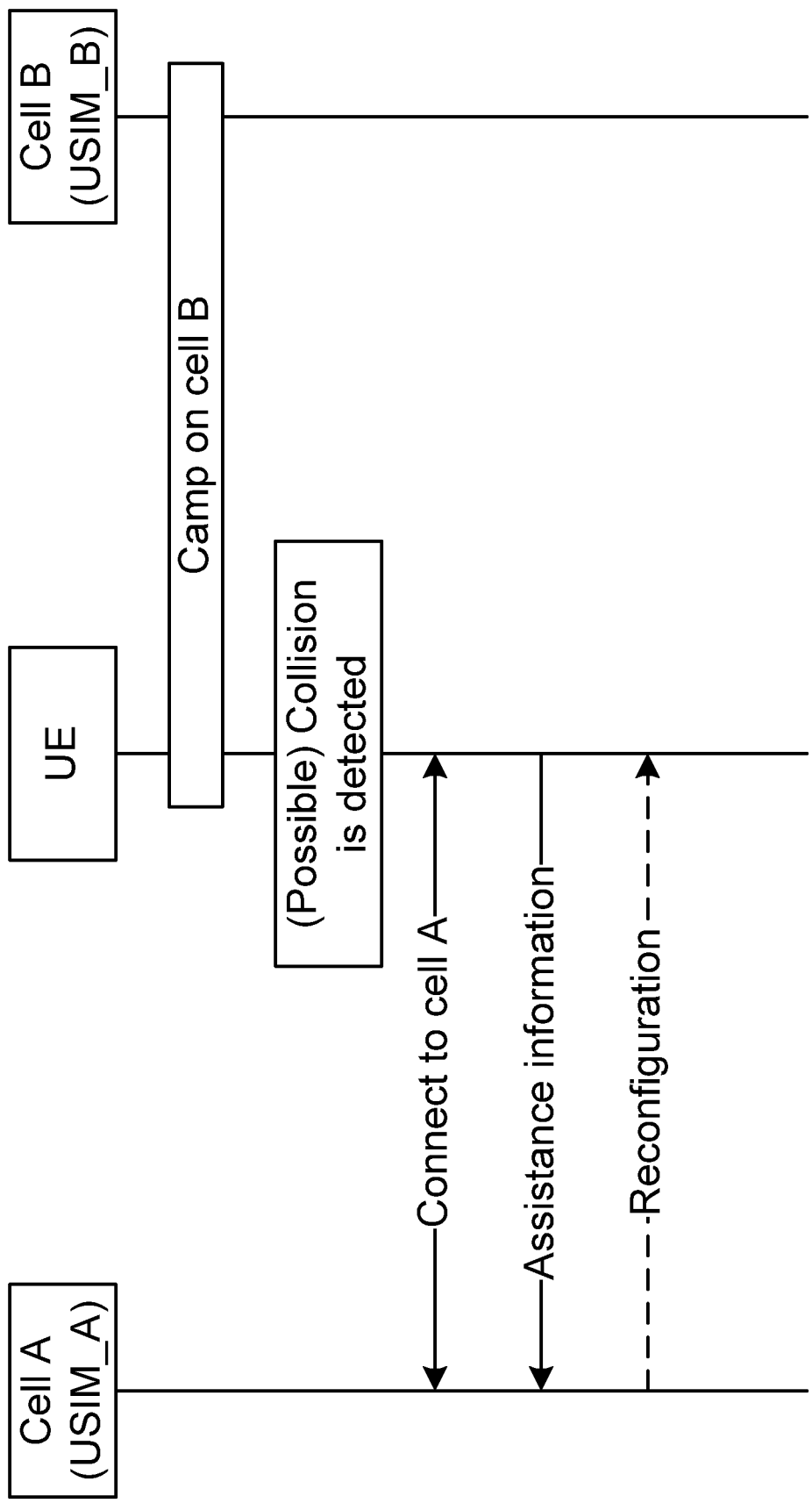
FIG. 8 is a diagram according to one exemplary embodiment.

The UE may need to establish or resume a RRC (Radio Resource Control) connection in order to provide the information. An example is shown in FIG. 8.

The UE could provide the information if the first USIM and the second USIM are from different MNOs (Mobile Network Operators). The UE may not need to provide the information if the first USIM and the second USIM are from the same MNO.

The UE could provide the information if the UE has single Rx. The UE could provide the information if the first USIM and second USIM share one single Rx. The UE may not need to provide the information if the UE has dual Rx. The UE may not need to provide the information if the first USIM and second USIM use different Rx.

The paging could be a signaling transmitted on PDCCH addressed to P-RNTI (Paging Radio Network Temporary Identifier). The paging monitoring could be performed in a serving cell associated with the first USIM.

RRC state associated with the first USIM could be RRC_IDLE. Alternatively, RRC state associated with the first USIM could be RRC_INACTIVE. RRC state associated with the second USIM could be RRC_IDLE. Alternatively, RRC state associated with the second USIM could be RRC_INACTIVE. Alternatively, RRC state associated with the second USIM could be RRC_CONNECTED.

The UE_ID could be IMSI. Alternatively, the UE_ID could be 5G-S-TMSI.

Based on the above information, the network node associated with a specific USIM of the UE, e.g. the first USIM or the second USIM, could adjust timing of transmitting paging and/or signaling, e.g. in a serving cell associated with the specific USIM, to prevent the (possible) collision.

For example, the network node could reconfigure value(s) of parameter(s) used by the UE to calculate timing of the paging monitoring associated with the specific USIM. The network node could provide parameter(s) used by the UE to shift timing of the paging monitoring associated with the specific USIM. The parameter(s) could be used to calculate paging frame(s), paging occasion(s), and/or PDCCH monitoring occasion(s). The parameter(s) could be reconfigured by a dedicated signaling. The parameter(s) could include PF_offset, T, N, Ns, nAndPagingFrameOffset, and/or UE_ID. The parameter(s) could include pagingSearchSpace, firstPDCCH-MonitoringOccasionOfPO, and/or the number of actual transmitted SSBs in a serving cell associated with the specific USIM.

As another example, the network node could reconfigure the UE about timing of reception of signaling associated with the specific USIM. Alternatively, the network could handover the UE to another serving cell with different timing of reception of signaling associated with the specific USIM. The signaling could be SSB. Alternatively, the signaling could be (periodic) CSI-RS.

The network node could adjust the timing by one or multiple of following signaling:

RRCReconfiguration message (as discussed in 3GPP TS 38.331)

Registration accept message (as discussed in 3GPP TS 24.501)

As an additional example, the network node could skip transmission of paging in paging occasion(s) with the collision. The network node could transmit paging in paging occasion(s) without the collision. Then, the network node may not need to reconfigure value(s) of parameter(s) used by the UE to calculate timing of the paging monitoring associated with the specific USIM.

The network node could be a RAN node or a CN node. The network node could be a base station, eNB, gNB, or AMF.

Figure 9:
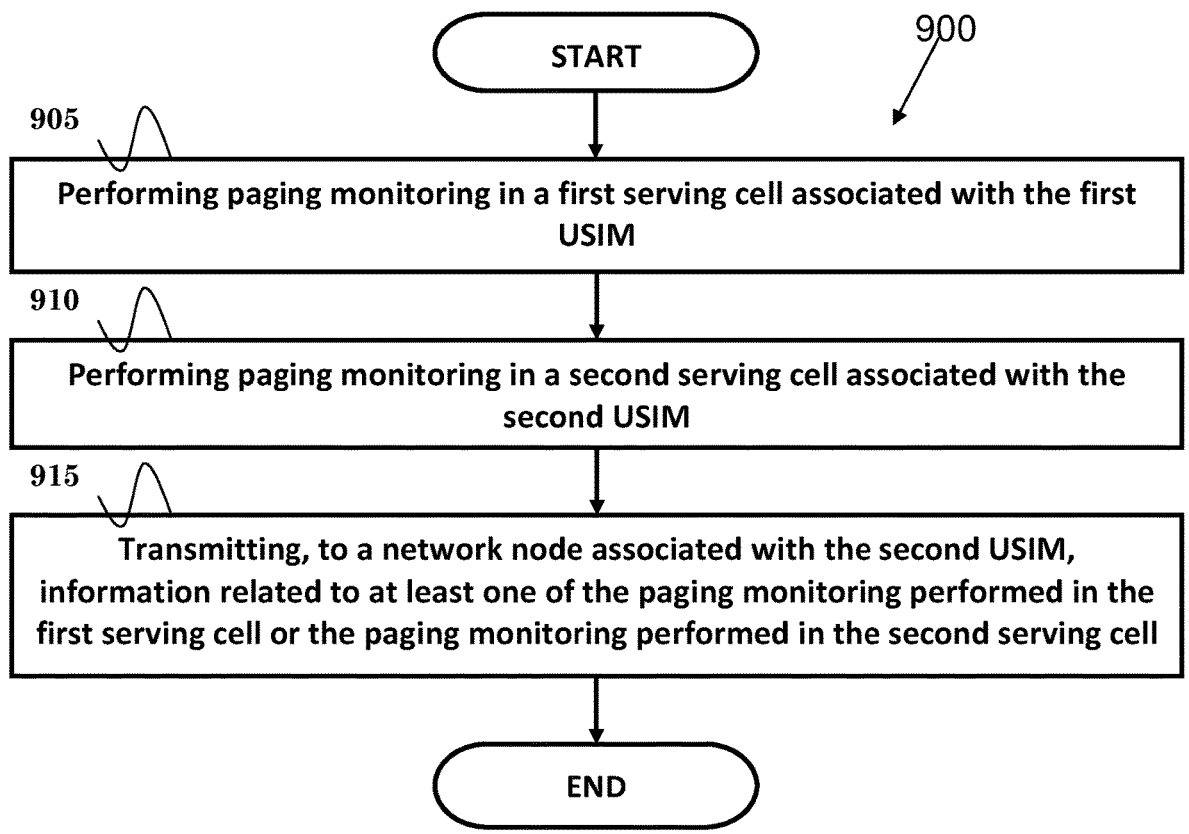
FIG. 9 is a flow chart according to one exemplary embodiment.

FIG. 9 is a flow chart 900 according to one exemplary embodiment from the perspective of a UE with a first USIM and a second USIM. In step 905, the UE performs paging monitoring in a first serving cell associated with the first USIM. In step 910, the UE performs paging monitoring in a second serving cell associated with the second USIM. In step 915, the UE transmits, to a network node associated with the second USIM, information related to at least one of the paging monitoring performed in the first serving cell or the paging monitoring performed in the second serving cell.

In one embodiment, the information could indicate occurrence of collision between the paging monitoring performed in the first serving cell and the paging monitoring performed in the second serving cell. Alternatively or additionally, the information could indicate: (1) timing of the paging monitoring performed in the first serving cell, (2) value(s) of parameter(s) used to calculate timing of the paging monitoring performed in the first serving cell, (3) suggested timing of the paging monitoring performed in the second serving cell, and/or (4) at least one suggested value of at least one parameter used to calculate timing of the paging monitoring performed in the second serving cell.

In one embodiment, the information could be transmitted in response to occurrence of collision between the paging monitoring performed in the first serving cell and the paging monitoring performed in the second serving cell. Alternatively or additionally, the information could be transmitted in response to timing change of the paging monitoring performed in the first serving cell. Furthermore, the information could be transmitted during a RRC connection establishment procedure, or a RRC (Radio Resource Control) connection resume procedure.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to perform paging monitoring in a first serving cell associated with the first USIM, (ii) to perform paging monitoring in a second serving cell associated with the second USIM, and (iii) to transmit, to a network node associated with the second USIM, information related to at least one of the paging monitoring performed in the first serving cell or the paging monitoring performed in the second serving cell. Furthermore, the CPU 308 can execute the program code 312 to perform all of the above-described actions and steps or others described herein.

Figure 10:
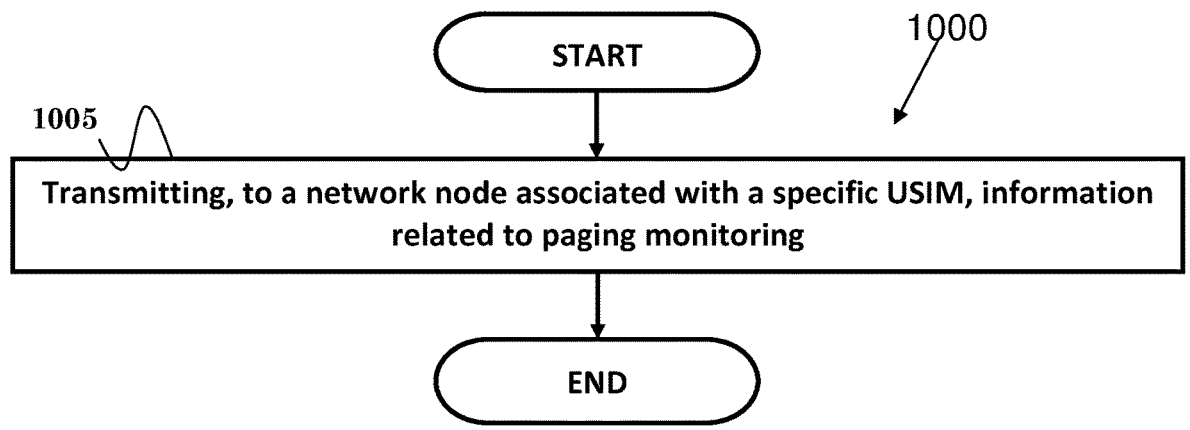
FIG. 10 is a flow chart according to one exemplary embodiment.

FIG. 10 is a flow chart 1000 according to one exemplary embodiment from the perspective of a UE with a first USIM and a second USIM. In step 1005, the UE transmits, to a network node associated with a specific USIM, information related to paging monitoring. In one embodiment, the paging monitoring could be performed in a serving cell associated with the first USIM, or in a serving cell associated with the second USIM.

In one embodiment, the information could indicate: (i) timing of the paging monitoring, (ii) paging frame(s) of the paging monitoring, (iii) paging occasion(s) of the paging monitoring, (iv) PDCCH monitoring occasion(s) of the paging monitoring, (v) value(s) of parameter(s) used to calculate timing of the paging monitoring, and/or (vi) suggested value(s) of parameter(s) used to calculate timing of the paging monitoring. The parameter(s) could include PF_offset, T, N or Ns, and/or UE ID.

In one embodiment, the information could indicate: (i) suggested timing of the paging monitoring, (ii) occurrence of collision of the paging monitoring, (iii) relief of collision of the paging monitoring, and/or (iv) SFN (System Frame Number) of a serving cell where the paging monitoring is performed.

Referring back to FIGS. 3 and 4, in one exemplary embodiment of a UE with a first USIM and a second USIM, the device 300 includes a program code 312 stored in the memory 310. The CPU 308 could execute program code 312 to enable the UE to transmit, to a network node associated with a specific USIM, information related to paging monitoring. Furthermore, the CPU 308 can execute the program code 312 to perform all of the above-described actions and steps or others described herein.

Figure 11:
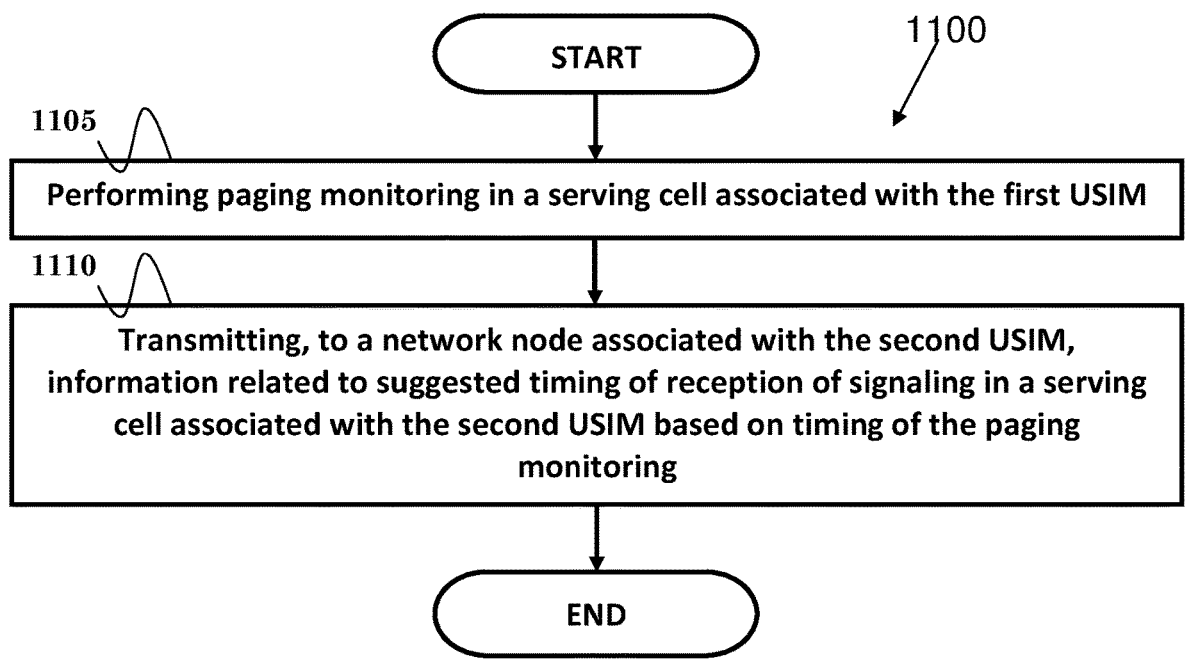
FIG. 11 is a flow chart according to one exemplary embodiment.

FIG. 11 is a flow chart 1100 according to one exemplary embodiment from the perspective of a UE with a first USIM and a second USIM. In step 1105, the UE performs paging monitoring in a serving cell associated with the first USIM. In step 1110, the UE transmits, to a network node associated with the second USIM, information related to suggested timing of reception of signaling in a serving cell associated with the second USIM based on timing of the paging monitoring.

In one embodiment, the signaling could include SSB. Alternatively or additionally, the signaling could include periodic CSI-RS.

Referring back to FIGS. 3 and 4, in one exemplary embodiment of a UE with a first USIM and a second USIM, the device 300 includes a program code 312 stored in the memory 310. The CPU 308 could execute program code 312 to enable the UE (i) to perform paging monitoring in a serving cell associated with the first USIM, and (ii) to transmit, to a network node associated with the second USIM, information related to suggested timing of reception of signaling in a serving cell associated with the second USIM based on timing of the paging monitoring. Furthermore, the CPU 308 can execute the program code 312 to perform all of the above-described actions and steps or others described herein.

In the context of the embodiments illustrated in FIGS. 10 and 11 and described above, the specific USIM could be the first USIM or the second USIM.

In one embodiment, the information could be transmitted in response to (i) occurrence of collision of the paging monitoring, (ii) relief of collision of the paging monitoring, (iii) timing change of the paging monitoring, (iv) enabling of the paging monitoring, (v) disabling of the paging monitoring, (vi) reception of a request from the network node, and/or (vii) serving cell change, e.g. due to handover or cell reselection.

In one embodiment, the information could be transmitted (i) during a RRC connection establishment procedure (as discussed in 3GPP TS 38.331), (ii) during a RRC connection resume procedure (as discussed in 3GPP TS 38.331), (iii) during an AS (Access Stratum) security activation procedure (as discussed in 3GPP TS 38.331), (iv) during a RRC connection re-establishment procedure (as discussed in 3GPP TS 38.331), (v) during a RRC connection reconfiguration procedure (as discussed in 3GPP TS 38.331), or (vi) during a registration procedure (as discussed in 3GPP TS 24.501).

In one embodiment, the first USIM and the second USIM could belong to different MNOs. The collision could be due to overlap between paging monitoring associated with the first USIM and paging monitoring associated with the second USIM in time domain, or due to overlap between paging monitoring associated with the first USIM and reception of the signaling associated with the second USIM in time domain.

Based on aforementioned method(s), example(s), and/or embodiment(s), timing of paging monitoring associated with one USIM of a UE colliding with timing of signaling reception, such as paging, SSB, and/or CSI-RS, associated with another USIM of the UE can be prevented.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) with a first USIM (Universal Subscriber Identity Module) and a second USIM, comprising:
performing paging monitoring in a first serving cell associated with the first USIM;
performing at least one of paging monitoring, SSB (Synchronization Signal Block) reception, or CSI-RS (Channel State Information Reference Signal) reception in a second serving cell associated with the second USIM; and transmitting, to a network node associated with the second USIM, information related to timing for the paging monitoring performed in the first serving cell in response to at least one of:
    change of the second serving cell associated with the second USIM, or
    change of the timing of the paging monitoring performed in the first serving cell.

2. The method of claim 1, wherein the timing for the paging monitoring performed in the first serving cell is derived based on a UE identity associated with the first USIM.

3. The method of claim 2, wherein the UE identity is IMSI (International Mobile Subscriber Identity) or 5G-S-TMSI (Temporary Mobile Subscriber Identity).

4. The method of claim 1, wherein the timing for the paging monitoring performed in the first serving cell includes paging occasions or PDCCH (Physical Downlink Control Channel) monitoring occasions for paging associated with the first USIM.

5. The method of claim 1, wherein the information is provided in a UEAssistanceInformation message.

6. The method of claim 1, wherein the information is transmitted in response to enabling of the paging monitoring associated with the first USIM.

7. The method of claim 1, wherein the information is transmitted in response to occurrence of collision between the paging monitoring performed in the first serving cell and at least one of the paging monitoring, the SSB reception, or the CSI-RS reception performed in the second serving cell.

8. The method of claim 1, wherein the information is also related to timing for the SSB reception or the CSI-RS reception in the second serving cell suggested by the UE.

9. The method of claim 1, further comprising:
    receiving, from the network node associated with the second USIM, a reconfiguration about reception timing of signaling associated with the second USIM in response to the information, wherein the signaling is SSB or CSI-RS.

10. The method of claim 1, further comprising:
    transmitting, to the network node associated with the second USIM, an indication about relief of the collision for the paging monitoring associated with the first USIM.

11. A UE (User Equipment) with a first USIM (Universal Subscriber Identity Module) and a second USIM, comprising:
    a processor; and
    a memory operatively coupled to the processor, wherein the processor is configured to execute a program code to:
        perform paging monitoring in a first serving cell associated with the first USIM;
        perform at least one of paging monitoring, SSB (Synchronization Signal Block) reception, or CSI-RS (Channel State Information Reference Signal) reception in a second serving cell associated with the second USIM; and
        transmit, to a network node associated with the second USIM, information related to timing for the paging monitoring performed in the first serving cell in response to at least one of:
            change of the second serving cell associated with the second USIM, or
            change of the timing of the paging monitoring performed in the first serving cell.

12. The UE of claim 11, wherein the timing for the paging monitoring performed in the first serving cell is derived based on a UE identity associated with the first USIM.

13. The UE of claim 12, wherein the UE identity is IMSI (International Mobile Subscriber Identity) or 5G-S-TMSI (Temporary Mobile Subscriber Identity).

14. The UE of claim 11, wherein the timing for the paging monitoring performed in the first serving cell includes paging occasions or PDCCH (Physical Downlink Control Channel) monitoring occasions for paging associated with the first USIM.

15. The UE of claim 11, wherein the information is provided in a UEAssistanceInformation message.

16. The UE of claim 11, wherein the information is transmitted in response to enabling of the paging monitoring associated with the first USIM.

17. The UE of claim 11, wherein the information is transmitted in response to occurrence of collision between the paging monitoring performed in the first serving cell and at least one of the paging monitoring, the SSB reception, or the CSI-RS reception performed in the second serving cell.

18. The UE of claim 11, wherein the information is also related to timing for the SSB reception or the CSI-RS reception in the second serving cell suggested by the UE.

19. The UE of claim 11, wherein the processor is further configured to execute a program code to:
    receive, from the network node associated with the second USIM, a reconfiguration about reception timing of signaling associated with the second USIM in response to the information, wherein the signaling is SSB or CSI-RS.

20. The UE of claim 11, wherein the processor is further configured to execute a program code to:
    transmit, to the network node associated with the second USIM, an indication about relief of the collision for the paging monitoring associated with the first USIM.

* * * * *